Nov. 23, 1965   R. M. BISSELL ETAL   3,219,782
JOYSTICK CONTROL SWITCH WITH ELECTROMAGNETIC DETENT
Filed Aug. 8, 1962   3 Sheets-Sheet 2

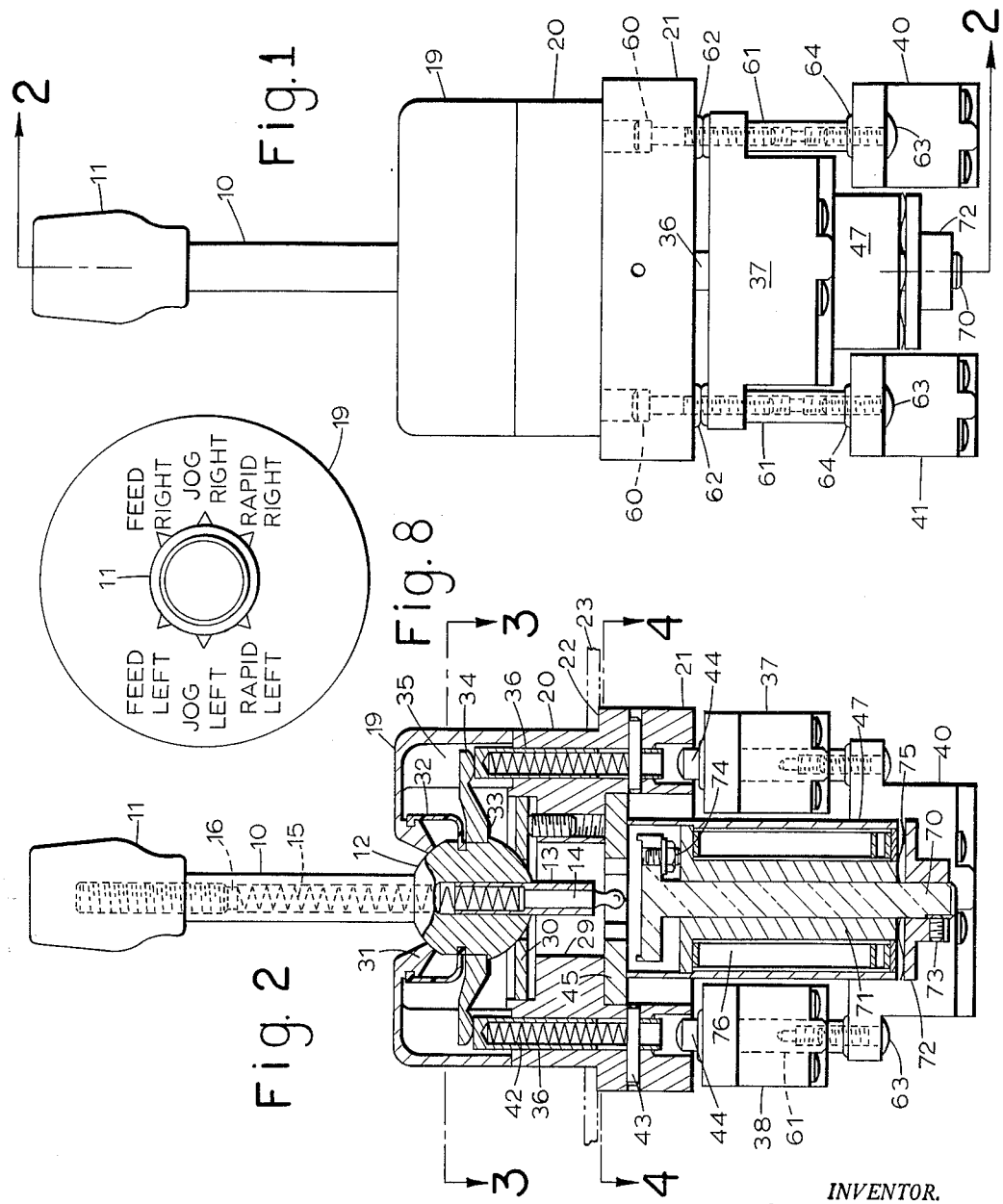

United States Patent Office 3,219,782
Patented Nov. 23, 1965

3,219,782
JOYSTICK CONTROL SWITCH WITH
ELECTROMAGNETIC DETENT
Richard M. Bissell, Cincinnati, Ohio, and Howard E. Gilb, Fort Thomas, Ky., assignors to The Cincinnati Milling Machine Co., Cincinnati, Ohio, a corporation of Ohio
Filed Aug. 8, 1962, Ser. No. 215,703
2 Claims. (Cl. 200—107)

This invention relates to a trip release switch for controlling the movement of a machine tool member and, more particularly, to a latching type of control switch which can be released from a remote location as, for example, by a trip dog on the machine tool member. The invention also has to do with a joystick type of switch structure which embodies new and unique principles of operation and new and improved features of construction.

Present day machine tool controls are becoming more and more complex and require an ever increasing number of push-buttons and selector switches on the operator's control panel for effecting operation of the machine. As the number of such switches increases, it becomes considerably more difficult for the operator to identify and manipulate the different control buttons and knobs with the certainty and speed required for the proper and efficient operation of the machine. As opposed to the usual push-buttons and selector switches, the joystick type of control switch provides the operator with a single lever which controls a plurality of functions and which provides a naturalness and ease of control which cannot be duplicated by any other type of switch. Thus, in accordance with the present invention, there is provided a switch having a single control lever which is movable to any one of six different positions to control a corresponding number of machine functions. For example, as applied to a reciprocating machine tool member, such as a table or saddle, the lever may have three right hand positions controlling feed right, jog right, and rapid traverse right, and three left hand positions controlling feed left, jog left, and rapid traverse left. The switch contacts controlling feed right and feed left are actuated by moving the lever to its upper right hand and upper left hand positions. The switch contacts controlling rapid traverse right and rapid traverse left are actuated by moving the lever to its lower right hand and lower left hand positions. Jogging movement of the member may be effected by moving the lever directly to the right and to the left from the neutral position. The switch is so designed that it is impossible for the machine operator to move the lever from its feed right or feed left positions directly down into the rapid traverse right or left positions without first centering the lever in the neutral position. Thus, inadvertent selection of a rapid traverse operation of the table or slide is prevented.

When the lever is moved to its upper right hand position, for example, two sets of switch contacts are operated in order to effect the feed right function. One pair of contacts controls feeding motion of the member to the right and the other pair of contacts actuates a latch which holds the lever in the feed right position until a trip dog on the moving member operates a switch and releases the latch. Likewise, when the lever is moved to its upper left hand position, the latch switch contacts are again operated together with a pair of contacts to control feeding motion of the member to the left. The lever will thereby be held in its feed left position until a trip dog on the member operates a switch to release the latch. When the lever is moved into its lower right hand position to effect rapid traverse movement of the member to the right, the switch contacts which effect feeding motion of the member to the right are again actuated along with a second pair of contacts which select rapid traverse. When the lever is moved into its lower left hand position to effect rapid traverse movement to the left, the pair of switch contacts which control the feeding motion to the left are actuated along with the above-mentioned second pair of switch contacts which select rapid traverse. In the jog right and jog left positions of the lever, only one pair of switch contacts is operated in each of these positions, these being the contacts which effect feeding motion of the member to the right and to the left. It will thus be seen that in the embodiment chosen for purposes of illustration, four pairs of contacts are arranged for actuation by the control lever, either singly or in combination, to effect the six control functions desired.

Since the control lever is biased to move to its neutral position whenever it is released by the operator, it must be held in its jog and rapid traverse positions in order to effect continued movement of the member. In the feed right and feed left positions, however, the lever is held against the urgency of the biasing means by the operation of the latch. The restraint provided by the latch may be overcome, however, by manually returning the lever to its neutral position. Hence, direction and rate control of a machine tool member may be achieved with a single control lever which is adapted to be held in its feeding position and released therefrom by a remote control element such as a trip dog on the machine tool member.

Accordingly, it is an object of the present invention to provide a joystick type of control switch for effecting feed, jog and rapid traverse movements of a machine tool member.

Another object of the invention is to provide a trip release type of feed switch with provision for manual override of the feed release mechanism.

Another object of the invention is to provide a joystick type of feed switch wherein the lever is adapted to be latched in a feed position and automatically released therefrom for return to its neutral position by a remotely operated trip release switch.

With these and other objects in view, which will become apparent from the following description, the invention includes certain novel features of construction and combinations of parts, the essential elements of which are set forth in the appended claims, and a preferred form or embodiment of which will hereinafter be described with reference to the drawings which accompany and form a part of this specification.

In the drawings:

FIG. 1 is a side elevation of the trip release switch.

FIG. 2 is a cross-sectional view taken along the line 2—2 in FIG. 1.

FIG. 8 is a plan view of the trip release switch.

Figure 4:
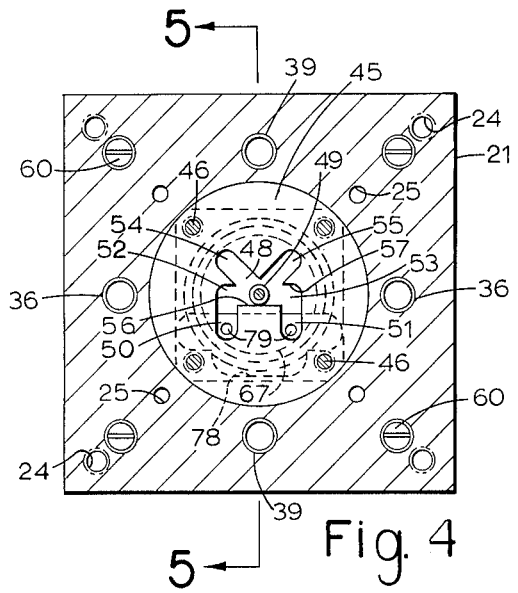
FIG. 4 is a cross-sectional view taken along the line 4—4 in FIG. 2.
Figure 3:
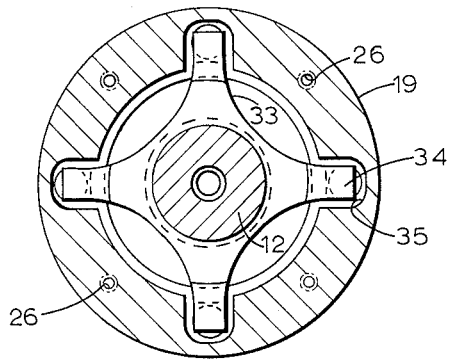
FIG. 3 is a cross-sectional view taken along the line 3—3 in FIG. 2.

In FIGS. 1 to 5, inclusive, of the drawings is shown a switch construction embodying the principles of the present invention. As shown therein, the switch includes a control lever 10 provided at its outer end with a handle or knob 11. At its inner end, the lever is fashioned with a ball 12 which is bored to receive a guide bushing 13 which slidably receives a headed plunger 14. Bearing against the headed end of the plunger is a compression spring 15 which is accommodated in the guide bushing 13 and in a longitudinal bore provided in the lever 10. At its upper end the spring 15 bears against a set screw 16 which is adjustable in an internally threaded portion of the bore to permit the pressure exerted by the spring on the plunger 14 to be adjusted as desired.

The ball 12 and bushing 13 are located within a switch housing comprised of a cover 19 and a body 20. The cover 19, and the portion of the body 20 immediately adjacent thereto, are of circular configuration as indicated by the plan view in FIG. 8. The body is also provided with a square portion 21 as shown in FIG. 4 which provides an offset or shoulder 22 (FIG. 2) for mounting the switch on a control panel 23 by screws (not shown) engaging in tapped holes 24 (FIG. 4). The cover 19 is adapted to be secured to the body 20 by screws (not shown) passing through holes 25 (FIG. 4) in the body 20, and threading into tapped holes 26 (FIG. 3) in the cover 19.

The body 20 is provided with a central bore 29 (FIG. 2) for accommodating the bushing 13 and the plunger 14 projecting therefrom. At its upper end, the bore 29 is enlarged to receive a ball seat plate 30 which, together with an inwardly turned flange 31 on the cover 19, provides a socket for the ball 12. A rubber boot 32 engaging with the flange 31 and the ball 12 effectively seals the switch against the entry of dirt and dust.

Figure 5:
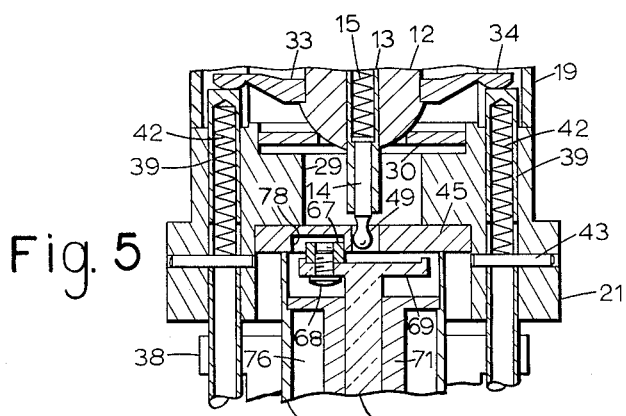
FIG. 5 is a cross-sectional view taken along the line 5—5 in FIG. 4.

Secured to the ball 12 is an actuating element 33 having four radially extending fingers 34 received within grooves 35 provided therefor in the cover 19. Each finger 34 overlies a switch operating plunger slidably received within a bore provided in the body 20. As shown in FIGS. 2 and 5, there are two short plungers 36 cooperating with right and left switches 37 and 38, respectively (FIG. 2), and two long plungers 39 cooperating with a latch switch 40 and a rapid traverse switch 41 (FIG. 1). Each of the plungers 36 and 39 is hollow and contains therein a compression spring 42 which, at one end, bears against the closed upper end of the plunger and, at the other end, bears against a retaining pin 43 supported in the body 20 and passing through an elongated slot in the plunger. Each plunger overlies an operating button 44 on its associated switch. The springs 42 acting on plungers 36 and 39 resiliently urge the lever 10 into a centralized or neutral position as shown in the drawings.

Movement of the lever from its neutral position is controlled by a guide plate 45 received in a counterbore provided in the body 20 at the lower end of the bore 29. This plate is held in place by screws 46 (FIG. 4) which pass through holes in a flange on a solenoid housing 47, thence through holes in the plate 45, and finally into tapped holes in the body 20. The plate 45 is provided with a cut-out 48 for receiving the ball-shaped end 49 of the plunger 14. As shown in FIG. 4, the cut-out 48 has a feed right niche 50, a feed left niche 51, a jog right niche 52, a jog left niche 53, a rapid traverse right niche 54, and a rapid traverse left niche 55. The cut-out is also provided with a shelf 56 and a pair of offsets 57 which necessitate movement of the lever around an abrupt corner in moving from a feed position to the neutral position. It is therefore impossible for the operator to move the lever from a feed position directly down into a rapid traverse position without first going through the neutral position. This serves to prevent an accidental or unintentional movement of the lever into the rapid traverse position when it is being moved out of the feed position against the urgency of the latch.

The switches 37, 38, 40 and 41 are secured to the rear end of the body 20 by four screws 60 (FIG. 1) which are received in counterbored holes in the portion 21 of the body and passed through holes in the mounting flanges of the switches and thence into tapped holes provided in mounting posts 61. Switches 37 and 38 are spaced from the body by washers 62 and switches 40 and 41, which are secured to the bottom ends of the posts by means of screws 63, are suitably spaced from the housing by washers 64.

The lever 10 is arranged to be held in the "Feed Right" and "Feed Left" positions (FIG. 8) by means of a detent plate 67 (FIG. 5) which is fastened by a screw 68 to a disc 69 formed on the upper end of a stem 70. The stem 70 is constructed of non-magnetic material and is slidably received in a flanged sleeve 71 made of iron or soft steel. The sleeve is assembled within the solenoid housing 47 with the flange on the upper end of the sleeve resting against a shoulder formed on the inside wall of the housing. The housing is made of iron or soft steel as is also an armature 72 which is secured to the bottom end of the stem 70 by a set screw 73. The stem is urged downwardly by a spring washer 75 interposed between the bottom of the housing 47 and the armature 72. Downward movement of the stem is limited by an adjustable stop screw 74 in the disc 69 which engages against the flange on the sleeve 71. The sleeve 71 is surrounded by a solenoid winding 76 which, when energized, attracts the armature 72 toward the gap formed between the lower end of the housing and the lower end of the sleeve 71 thereby urging the stem 70 upwardly against the bias of the spring washer 75. The washer 75 is formed of non-magnetic material so as to always maintain a small air gap between the armature and the ends of the housing and sleeve. This aids the spring washer in moving the stem downwardly against the residual magnetism of the iron when the solenoid is deenergized. The detent plate 67 (FIG. 5) is adapted to be received within a cutout 78 (FIGS. 4 and 5) provided in the lower surface of the guide plate 45. The right hand edge of the plate 67, as viewed in FIG. 5, is flat and lies adjacent a corresponding surface formed in the cutout 78 which prevents rotation of the stem. The upper surface of the plate 67 is provided with a pair of depressions 79 (FIG. 4) which cooperate with the bottom portion 49 of plunger 14 when the solenoid is energized and hold the lever 10 in either of the feed positions. If the operator wishes to disable feeding movement of the machine tool member while the solenoid remains energized, he may do so by manually moving the lever out of the feed position, the plunger 14 being forced upwardly against the urgency of the spring 15.

Figure 6:
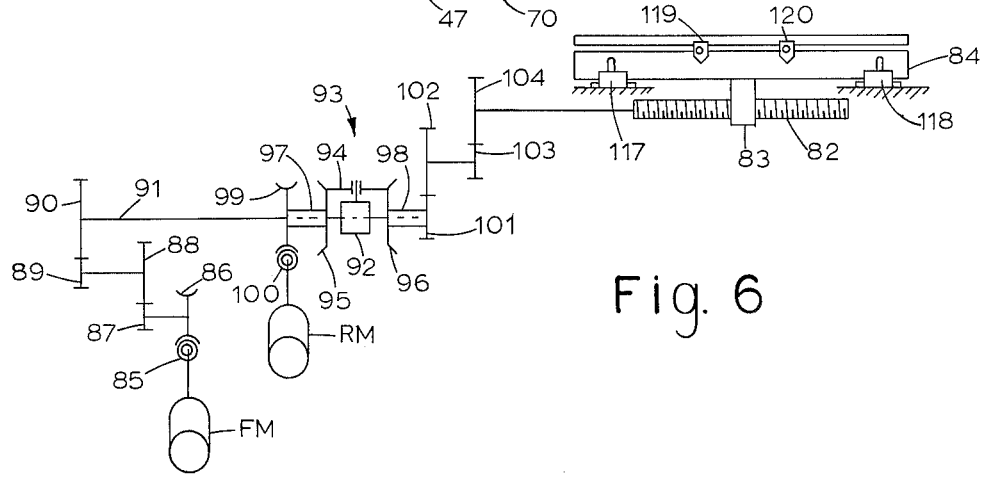
FIG. 6 is a diagrammatic view of a feed and rapid traverse drive mechanism for a machine tool member.

As mentioned earlier herein, the switch control lever may be released automatically from a feed position by a remotely located switch. This switch, for example, may be arranged for operation by a trip dog on the movable machine tool member so as to cause feeding movement of the member to continue until it reaches a predetermined position whereupon the trip dog will operate the switch and deenergize the solenoid winding 76. For the purpose of illustrating this feature of the invention there has been shown in FIG. 6 a diagrammatic view of a feed and rapid traverse drive mechanism for a machine tool slide. This mechanism includes a feed motor FM and a rapid traverse motor RM which are arranged to drive a feed screw 82 which engages with a feed nut 83 secured to a slide 84. When the feed motor FM is energized, it drives a worm 85 which meshes with a worm wheel 86. The worm wheel is connected through spur gears 87, 88, 89 and 90 to a shaft 91 to which a carrier 92 of a differential 93 is secured. Journaled for rotation on the carrier 92 is a bevel spider gear 94 which meshes with bevel gears 95 and 96 secured to sleeves 97 and 98 which are freely rotatable on the shaft 91. The sleeve 97 carries a worm wheel 99 which meshes with a worm 100 driven by the motor RM. Assuming the motor RM to be deenergized, worm wheel 99 will be held stationary whereby rotation of shaft 91 will cause the spider gear 94 to drive the bevel gear 96 and sleeve 98. Secured to the latter sleeve is a spur gear 101 which is connected through gears 102, 103 and 104 to the feed screw 82. Due to the reduction gearing between the feed motor FM and the shaft 91, the slide 84 will be driven at a feed rate. When the feed motor FM is deenergized and the rapid traverse motor RM is energized, the shaft 91 will be held stationary while the worm wheel 99 will be driven. Thereby, the bevel gear 95 of the differential will drive the bevel 96 thereof through the spider gear 94 and cause the feed screw 82 to be driven at such a speed as to produce rapid traverse movement of the slide.

Figure 7:
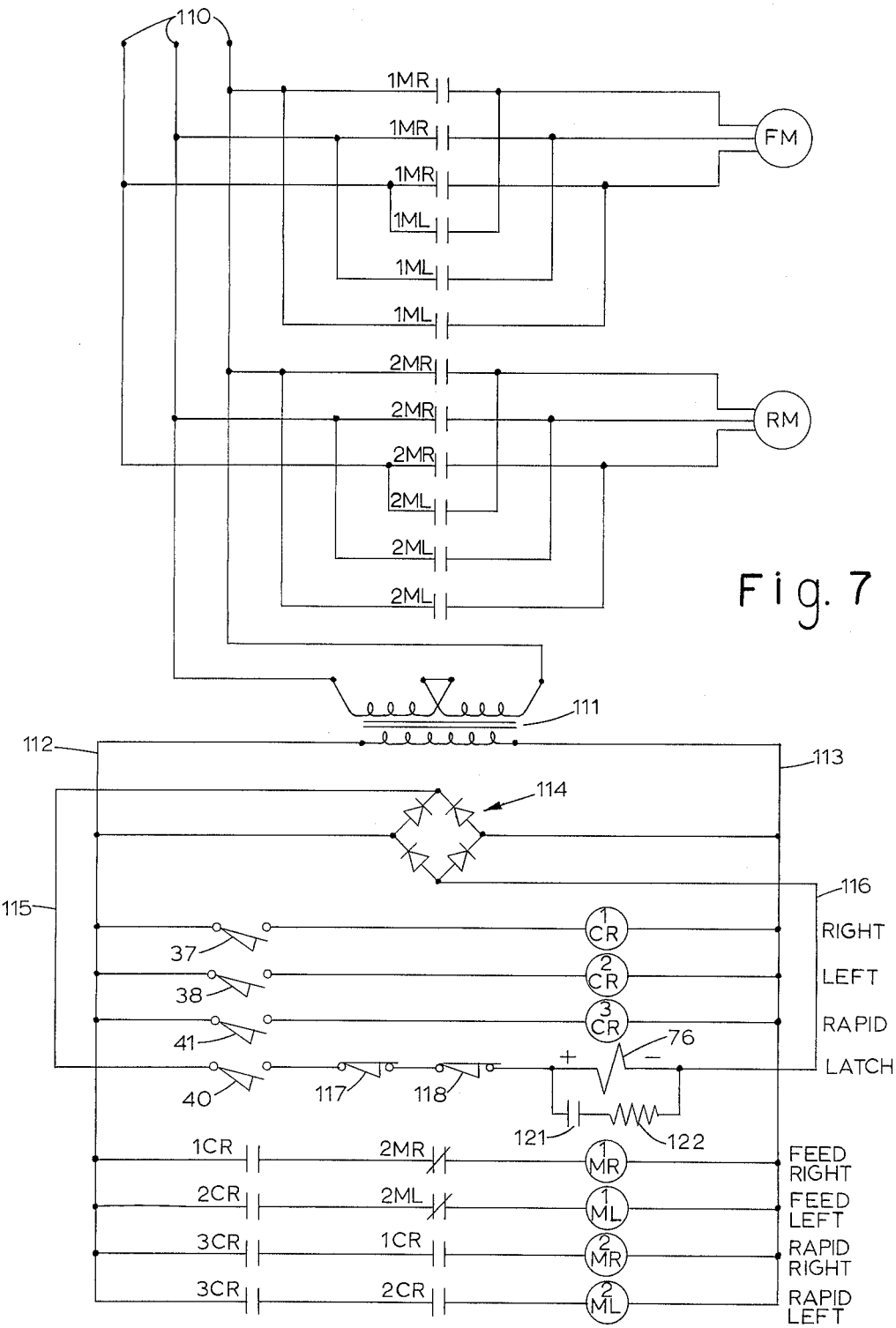
FIG. 7 is a wiring diagram of the electrical control circuit for the drive mechanism.

In FIG. 7 of the drawings is shown a wiring diagram of the control circuitry for the motors FM and RM as well as the means for controlling these motors by manipulation of the switch control lever 10. Energizing potential for the circuit shown in FIG. 7 is provided by a three phase supply 110. The three-phase motors FM and RM are connected through reversing relay contacts to the three-phase supply lines. The primary winding of a transformer 111 is connected across one phase of the supply and the secondary winding thereof is connected to lines 112 and 113 so as to provide single phase A.C. current to the components connected across these lines. Inasmuch as the solenoid winding 76 is designed for D.C. operation, a rectifier 114 is connected across lines 112 and 113 and the D.C. output from the rectifier is supplied by conductors 115 and 116 to the solenoid through the latch switch 40 and limit switches 117 and 118. These switches are adapted to be operated by adjustable dogs 119 and 120, respectively (FIG. 6), carried by the slide 84. A capacitor 121 and resistor 122 are connected in series across the solenoid winding 76 to prevent arcing across the switch contacts when the same are opened to break circuit to the solenoid.

When the control lever 10 is moved to the right and left jog positions 52 and 53 (FIG. 4), switches 37 and 38, respectively, will be operated and cause either relay 1CR or 2CR to be energized. Accordingly, either the feed right relay 1MR or the feed left relay 1ML will be energized and close their contacts in the energizing circuit for motor FM to cause forward or reverse rotation of this motor. As previously explained in connection with FIG. 6, this will cause feeding movement of the slide 84 to take place as long as the lever is held in one or the other of the jog positons.

When the control lever 10 is moved to the feed right position 50 (FIG. 4), switches 37 and 40 will be operated to energized relay 1CR and solenoid winding 76. When the lever is moved to the feed left position 51, switches 38 and 40 will be operated to energize relay 2CR and solenoid winding 76. The lever will thereby be held in the feed right or feed left position and cause continued feeding movement of the slide 84 until a limit switch 117 or 118 is operated by its associated dog 119 or 120 to break the circuit to solenoid winding 76 and release the control lever.

When the control lever is moved to the rapid traverse right position 54 (FIG. 4), switches 37 and 41 will be operated to energized relays 1CR and 3CR. When the lever is moved to the rapid traverse left position 55, switches 38 and 41 will be operated to energize relays 2CR and 3CR. In the first instance, rapid traverse relay 2MR will be energized to close its contacts in the energizing circuit of motor RM and cause rapid traverse movement of the slide 84 to the right. In the second instance, rapid traverse relay 2ML will be energized to close its contacts in the energizing circuit of motor RM and cause reverse rotation of the motor to drive the slide 84 in rapid traverse moevment to the left. Relays 2MR and 2ML have normally closed contacts connected in circuit with the feed right and feed left relays 1MR and 1ML so as to prevent energization of the motor FM when motor RM is energized.

It is to be understood, of course, that the foregoing disclosure, is intended to be illustrative only and that changes and modifications can be restorted to without departing from the invention as defined in the appended claims.

What is claimed is:

1. A joystick control switch comprising a housing, a joystick lever supported in said housing intermediate its ends for universal pivoting movement, said lever having a neutral position and at least one active position, a plurality of switches mounted in said housing, a plunger associated with each of said switches for operating the same, means on said lever inside of said housing for actuating said plungers when the lever is moved from its neutral position to an active position, means for resiliently urging said lever into its neutral position, an electromagnetic actuator supported in said housing, detent means on said actuator and cooperating with the end of said lever inside of said housing for holding the lever in an active position, said yieldable means on said lever cooperating with said detent means to releasably hold said lever in an active position when said electromagnetic actuator is energized.

2. The switch of claim 1 for controlling the operation of a machine tool slide including power operated means for moving said slide in response to the actuation of said switches by said lever, and switch means actuated by said slide in response to its movement by said power operated means for deenergizing said electromagnetic actuator and stopping said slide.

References Cited by the Examiner

UNITED STATES PATENTS

| 2,679,678 | 6/1954 | Stephan | 200—6 |
| 2,984,720 | 5/1961 | Fisher | 200—6 |
| 2,991,403 | 7/1961 | Groft | 318—266 |

FOREIGN PATENTS

| 438,581 | 3/1912 | France. |
| 301,519 | 12/1928 | Great Britain. |

BERNARD A. GILHEANY, *Primary Examiner.*